United States Patent [19]

Takamura et al.

[11] 3,870,564
[45] Mar. 11, 1975

[54] ALKALINE CELL

[75] Inventors: Isutomu Takamura, Kawasaki; Yoshimi Kanada, Tokorozawa; Shintari Suzuki, Yokohama, all of Japan

[73] Assignee: Tokyo Shibaura Electric Co., Ltd.

[22] Filed: Mar. 30, 1973

[21] Appl. No.: 346,433

[52] U.S. Cl. ................................ 136/30, 136/125
[51] Int. Cl. .......................................... H01m 43/02
[58] Field of Search .............................. 136/30–31, 136/125, 106, 6 R, 95, 102, 107, 111, 115, 126, 157, 137

[56] References Cited
UNITED STATES PATENTS

| | | | |
|---|---|---|---|
| 2,859,268 | 11/1958 | Fischbach et al. | 136/126 |
| 2,931,846 | 4/1960 | Cunningham et al. | 136/30 |
| 2,987,567 | 6/1961 | Freas et al. | 136/30 X |
| 3,451,851 | 6/1969 | Stanimirovitch | 136/30 |
| 3,466,195 | 9/1969 | Spellman et al. | 136/30 |
| 3,530,496 | 9/1970 | Amano et al. | 136/30 |
| 3,671,319 | 6/1972 | Arrance | 136/30 X |
| 3,749,605 | 7/1973 | Peters | 136/30 |

FOREIGN PATENTS OR APPLICATIONS

| | | | |
|---|---|---|---|
| 46-8330 | 3/1971 | Japan | 136/30 |

*Primary Examiner*—Anthony Skapars
*Attorney, Agent, or Firm*—Oblon, Fisher, Spivak, McClelland & Maier

[57] ABSTRACT

An alkaline cell containing as its negative zinc electrode a mixture comprising zinc oxide, a metallic oxide durable in alkaline solutions, a gel forming material and an alkaline electrolyte which is characterized by an improved capacity under heavy current discharge loads, improved low temperature discharge characteristics and improved stability during storage. The zinc negative electrode composition may be shaped in the form of a sheet which may be combined with a sheet of liquid holding material and a separator sheet.

6 Claims, No Drawings

ALKALINE CELL

BACKGROUND OF THE INVENTION

1. Field of the Invention

The invention relates to an alkaline cell and, in particular, to an alkaline cell whose negative electrode material comprises finely divided zinc particles, which is charaterized by an improved initial capacity under a heavy current load at low temperatures, improved stability during storage or shelf life, and improved cycle life when the cell is used as a secondary cell.

2. Description of the Prior Art

It is well known that alkaline cells comprising a positive electrode material, finely divided zinc particles as the negative electrode material, a separator and an electrolyte are widley used as sliver oxide-zinc, mercuric oxide-zinc, zinc-air, managanese dioxide-zinc, or nickel oxide-zinc cells. These cells are theoretically characterized by low overvoltage (even under high load current), simple construction, good low temperature characteristis, and an improved initial capacity. Practically, however, these characteristics have been difficult to reproduce in commerical cells.

In the battery art, several patents have been issued which disclose alkaline cells in which finely divided zinc particles are employed as the negative electrode material. It has also been recommended to disperse the finely divided zinc particles in a gel-like alkaline electrolyte. For example, Douchan Stanimicrovitch (U.S. Pat. No. 3,451,851 issued June 24, 1969), discloses the use of gel forming materials which include cellulose derivatives such as carboxymethylcellulose, carboxyvinyl polymers and polyvinyl alcohols and its derivatives in the fabrication of secondary batteries. Yasuji Amano in U.S. Pat. No. 3,530,496 issued Sept. 22, 1970, shows the use of the sodium salt of carboxymethylcellulose as a gel forming material in rechargeable alkaline batteries.

Improvements in the cycle life of rechargeable cells has been achieved by Hiromichi Ogawa, et al. (Japanese Pat. No. 401859 issued on June 25, 1962), wherein alkaline earth hydroxides are shown to be effective in preventing the dissoluton of zincate ions formed during cell discharge. However, there is no disclosure regarding the use of gel forming materials in the formation of negative electrode materials. It has been shown by P. J. Spellman, and J. A. Youngtuist (U.S. Pat. No. 3,466,195) issued July 20, 1966 that the prevention of the dissoluton of zincate ions into the electrolyte substantially improved the initial capacity and storage life of the cell. The reference also discloses that the presence of silicate ion significantly retards the dissolution of zincate ions into the electrolyte. Cells of this configuration have an improved initial capacity and storage life, but it has been shown that there is a concomitant reduction in the heavy duty and low temperature characteristics of the cell.

Another method which effectively prevents movement of material formed during discharge of the cell is disclosed by Elihu C. Jerabek (U.S. Pat. No. 3,575,723 issued Apr. 20, 1971), wherein the addition of magnesium oxide to the alkaline electrolyte increases the viscosity of the electrolyte. The scope of the disclosure, however, is limited to zinc-silver cells where the problem occurs at the silver electrode.

Further improvements in the negative zinc electrode have been developed by Akio Nagamine and Isao Sato, as disclosed in Japanese Pat.. Nos. 46/8330 to 8333, wherein the inventors combined the above mentioned procedures. The materials which comprise the electrode are finely divided zinc powder, a powder mixture of gel forming materials and the appropriate metal oxides or other inorganic compounds which are stable to alkaline media. Suitable metallic ions of the inorganic compoounds include magnesium, aluminum, calcium, barium and titanium. These materials are mixed and kneaded with a small amount of water to form a suitable negative electrode material, which is compressed after the material has dried. Formation of the negative electrode material by this procedure improves the heavy drain discharge capacity and low temperature characterisitcs of the cell. The procedure of this invention is substantially effective with small flat cells. However, there is no indication that the storage capacity of the cells is improved. Actual examination of the procedure has shown that penetration of the concentrated electrolyte into the zinc electrode paste required too long a time to give a cell with the expected capabilities. Furthermore, the dispersion of the inorganic powder material around the zinc particles in a short period of time proved difficult because of the strong aggregative force between the fine powder particles.

A need, therefore, exists for improved alkaline cells which have a low overvoltage even under high current discharge loads.

SUMMARY OF THE INVENTION

Accordingly, one object of the present invention is to provide an improved alkaline cell having a low overvoltage even under high current dishcarge loads.

Another object of this invention is to provide an improved alkaline cell with a high initial capacity.

Still another object of the present invention is to provide an alakaline cell having an improved performance at low temperatures.

Yet another object of this invention is to provide an improved alkaline cell having a good service life even after having been stored for long periods of time.

Briefly, these objects and other objects of this invention as hereinafter will become readily apparent can be attained by a process for preparing a negative electrode material having improved performance characteristics under heavy current discharge and at low temperatures which comprises blending finely divided zinc particles and particles of an inorganic compound which is stable and is wetted well by a caustic alkaline solutions, in—and is wetted well by a caustic alkaline solutions, in—said blend of materials with gel forming materials and kneading the mixture of materials with an alkaline electrolyte. Further, it has been found that admixture of a fine powder of cellulose and boric acid or its related compounds with the mixture of metal compounds before the addition of caustic alkaline solution yields easily handled electrode pellets.

DETAILED DESCRIPTION OF THE PREFERRED EMBODIMENTS

The finely divided zinc particles used in the formation of the electrode composition of this invention may be in the form of amalgamated particles or fibers. Suitable inorganic compounds which may be blended with the finely divided zinc particles include the oxides or hydroxides of such metals as: magnesium, barium, titanium, aluminum and zirconium. Compounds containing these metals are commerically available chemicals.

These oxides and hydroxides have the ability to absorb large quantities of alkaline solution between particles, and of having high surface conductivity when they are moistened by alkaline solutons.

Suitable gel forming materials for use in the electrode compositions include carboxyvinylpolymers and polyacrylate salts. Suitable counter ions of the polyacrylates include protons, alkali — or alkaline earth metals or zinc. Carboxymethylcellulose has been used in many applications by those skilled in the art. However, for the purposes of this invention it is not as good as the above-mentioned polymers since not only is the amount of carboxymethyl- cellulose required to achieve the appropriate viscosity rather large, but also it is not as stable as the other polymers in strongly caustic alkaline solutions.

Zinc oxide powder has been found to be an important material for the purpose of obtaining a good dispersion in a short time. This material has an affinity both for zinc particles and the inorganic oxides or hydroxides which helps to combine the particles of the zinc electrode material with the electrolyte absorbing materials.

When the electrode materials are kneaded together with an alkaline electrolyte, the prepared dispersion yields a low overvoltage even under high discharge currents, and maintains a good dispersion for a long time which prevents aggregation and merging of the zinc particles.

The preferred amounts of the inorganic oxides or hydroxides and zinc oxide in the negative electrode compositions range form 0.1 to 20 weight percent, and the amount of the gel forming materials ranges from 0.05 to 10 weight percent.

The alkaline electrolyte, which is kneaded with the electrode material, may have the same concentration as the electrolyte which is disposed between the negative and positive electrodes, i.e., the concentration ranges from 20 to about 45percent by weight of potassuim hydroxide or sodium hydroxide, wherein the electrolyte solution is preferably saturated with ZnO. Further, the electrolyte may preferably be saturated with one of the aforementioned metal oxides or hydroxides. This is helpful in preventing the unexpected consumption of the oxides (or hydroxides added to the negative electrode material.

The compressed form of the negative electrode material made in accordance with the process of the present invention is clearly distinguishable from the negative electrode composition described by Nagamine and Sato which contains no boron compounds which act as cross-linking agents. The cross-linking action of the boron compounds is very effective in reducing the necessary amount of gel forming material required for formation of the electrode composition, otherwise, the negative electrode material obtained would have less of an ability to absorb the alkaline electrolyte, which is added during assembly of the cell resulting in diminished cell performance.

A compressed form of the negative electrode material is combined with the other materials necessary for making an alkaline cell, i.e., a separator and electrolyte holding materials. During the course of assembly of small cells, handling of the small thin sheets which are used as the separator or the electrolyte holding material is very troublesome due to their size and the undesirable tendency to adhere to other objects because of the presence of static electricity. These unpleasant aspects can be eliminated by laminating these materials which the electrode material. Prior to the lamination, a large sheet of the electrode material is made. Then sheets of the separator and electrolyte holding material are laminated together by applying the gel forming material as a binder. The laminate obtained may then be cut to any desired shape. Suitable electrolyte holding materials include nonwoven cotton, polyamide and other porous materials durable to alkaline solutions. The electrolyte holding material preferably comes in contact with the negative electrode material. The surface of the electrolyte holding material is covered by a separator sheet, which comes in contact with the positive electrode material. This embodiment of the fabrication of the cell components is very effective, not only for reducing handling costs during assembly of the cells but also for increasing the assembly yield.

The positive electrode material of the alkaline cells made by the process of this invention, generally comprises an active material such as nickel oxide, silver oxide and a porous electrode, though it is not limited to these particular materials, The positive electrode material is used in the form of finely divided particles Many of the positive active materials have poor electrical conductivity and, therefore, it has been the conventional practice to incorporate a conductive ingredient such as graphite, carbon black, acetylene black, nickel or silver particles into the positive electrode materials.

Between the positive electrode and zinc negative electrode, are placed the electrolyte holding materials and a separator. Suitable separator materials include any of the materials conventionally used as separators for alkaline cells such as cellulosic material and microporous plastics such as polyethylene, polypropylene, polyvinylchloride or polyamide resins. In some cases, the separator also serves as an electrolyte holding material. to The cells of this invention utilize a conventional alkaline electrolyte such as a solution of potassium hydroxide or sodium hydroxide. The alkaline electrolyte may be prepared as described by Samuel Ruben in U.S. Pat. No. 2,422,045 issued June 10, 1947, which contains a substantial quantity of zinc in solution as zincate ions. The alkaline electrolyte generally contains alkaline concentrations ranging from 20 to 45percent by weight.

Having generally described this invention, a further understanding can be obtained by reference to certain specific examples which are provided herein for purposes of illustration only and are not intended to be limiting unless otherwise specified.

The degree to which the overpotential under high current discharge loads of the primary alkaline cells has been reduced, and the degree to which the discharge performance at low temperatures, the stability during storage and the initial capacity of the primary alkaline cells has been improved by application of the process of this invention is demonstrated by the following examples. The term "part" indicates part by weight.

EXAMPLE 1

| Composition: | Amalgamated (10%) pulverized zinc (particle size through 100 mesh) | 97 parts |
|---|---|---|
| | Zinc oxide powder | 1 part |
| | Magnesium oxide powder | 2 parts |
| | Carboxylmethyl polymer powder | 2.2 parts |

EXAMPLE 2

Composition:
| | |
|---|---|
| Amalgamated (10%) pulverized zinc (Particle size through 100 mesh) | 96 parts |
| Zinc oxide | 2 parts |
| Titanium dioxide powder | 2 parts |
| Carboxyvinyl polymer powder | 2.5 parts |

EXAMPLE 3

Composition:
| | |
|---|---|
| Amalgamated (10%) pulverized zinc (particle size through 100 mesh) | 96 parts |
| Zinc oxide powder | 2 parts |
| Zirconium oxide powder | 2 parts |
| Carboxyvinyl polymer powder | 2.5 parts |

The powders of Examples 1, 2 and 3 were independently mixed in a V-mixer for 20 to 30 minutes. 100 Parts of the resulting thoroughly mixed powders were mixed with 70 parts of 35percent KOH containing 5percent ZnO in a nitrogen stream resulting in a gel-like dispersion. The dispersions were used as negative electrode materials. As a positive electrode material, 95 parst of yellow mercuric oxide powder were mixed with 5 parts of graphite powder and compressed under a pressure of 2 ton/cm² in a container the size of which was chosen to conform to a JIS H-C cell, Over the surface of said positive electrode material in the cell, a sheet of nonwoven polyamide resin was placed which contained 100 μof a 35percent potassuim hydroxide solution saturated with zinc oxide. Using the anodic (negative) electrode materials of Examples 1,2 and 3, zinc-mercuric oxide cells were assembled. In additon, a similar cell was made by using essentially the same negative electrode material described in Example 1, except that zinc oxide and the alkaline soluton were not use. This cell was employed as a reference cell.

All of the cells were used in a 500 Ω continuous discharge test at room temperature down to an average cut-off voltage of 0.9 volts. The duration times were 3,520, 3,460, and 3,390 minutes for the cells containing the electrode compositions of Examples 1, 2, and 3, respectively. The average operating voltage was 1.22 volts for all of the cells. These cells are compared to the reference cell which endured for 268 minutes at an average operating voltage of 1.20 volts which shows the advantage of the present invention. These improvements were also observed in cells which contained aluminum or calcium oxides or hydroxides in the electrode material instead of one of the aforementioned inorganic oxides or hydroxides. Where the oxides or hydroxides are somewhat soluble in the electrolyte, better results were obtained by saturating the electroylte with the oxide or hydroxide prior to mixing with the electrode powder composition.

After storage of the cells for specified periods of time (see Table I), , the current-voltage characteristics of the cells were measured by the same procedure as described above. The results are summarized in Table 1 where the improved effects of this invention are readily seen.

TABLE 1

Capacity loss of the alkaline cells during storage

| Storage conditions | Decreased capacity divided by the capacity immediately after assembly. | | | |
|---|---|---|---|---|
| | Example 1 | Example 2 | Example 3 | Reference Cell |
| Room temperature 9 months | 1.8% | 2.0% | 2.1% | 6.2% |
| 45° C 3 months | 2.6% | 2.2% | 3.7% | 7.2% |

EXAMPLE 4

Composition:
| | |
|---|---|
| Amalgamated (5%) pulverized zinc (particular size through 100 mesh) | 90 parts |
| Magnesium oxide powder | 8 parts |
| Zinc oxide powder | 2 parts |
| Sodium polyacrylate | 2 parts |

EXAMPLE 5

Composition:
| | |
|---|---|
| Zinc fiber of 150 μ diameter was cut to a length of 2 mm and was annealed at 200°C for 10 hours then cooled to room temperature. | 90 parts |
| Zinc oxide powder | 4 parts |
| Titanium dioxide powder | 4 parts |
| Sodium polyacrylate | 2 parts |

To 100 g of the well mixed composite materials of Examples 4 and 5, 70 ml of 30 percent KOH containing 5 percent ZnO was added to each powder mixture, and each mixture was kneaded under an inert gas atmosphere to yield a composite negative electrode paste. Two, 200 μ thick, 14 mm diameter nonwoven polyamide tubes were filled with each of the prepared electrode pastes, and the tubes were inserted in the center of the inner can of two UM-2 alkaline cells.

Chemically synthesized nickel oxide powder was mixed with 8 percent powdered graphite and 4 percent, polystyrene and compressed into a cylinder whose outer and inner diameters were 24.2 and 14.2 mm, respectively, and whose height was 17 mm. Two pieces of cylindrically shaped electrode material obtained from the cylindrical object were inserted into the inner can of two alkaline UM-2 cells. Into the vacant space in the center of the cylinder in the can, a 14 mm diameter nonwoven polyamide textile cylinder was inserted and the cylinder was filled with the gel mentioned above. A 3 mm diameter brass rod 42 mm in length was used as the negative current collector. The top of this rod was connected electrically to the outer cap which was used as the negative pole. The UM-2 cells were thus assembled and subjected to discharge tests under 10 Ω and 3 Ω loads. Duration times were measured down to a cut-off average voltage of 0.9 volts for each cell. In addition, the same procedures were used to assemble and test a reference cell. However, the solid constituents of the negative zinc electrode composition used were: amalgamated (5 percent) pulverized zinc (particle size through 100 mesh) — 98 percent; carboxymethylcellulose — 2 percent. The results are summarized in Table 2.

TABLE 2

| Discharge Conditions | Duration time under continuous discharge (m∓10) Duration Time (min.) | | |
|---|---|---|---|
| | Example 4 | Example 5 | Reference Cell |
| 3Ω continuous | 73 | 76 | 54 |
| 10Ω continuous | 390 | 378 | 325 |

As is readily seen from the data in the table, the cells containing the negative electrode of this invention have improved properties, especially under heavy current loads.

EXAMPLE 6

The zinc anode was prepared according to the same procedure as described in Example 5. The positive electrode mixture was made by mixing 80 parts of electrolytic $MnO_2$ and 15 parts powdered graphite, kneading the mixture together with 8 parts of a 35 percent KOH solution, and compressing the paste under 2 ton/cm$^2$ pressure into a cylindrically shaped object whose size was the same as the cylinder described in Example 5. The cylindrically shaped object was severed into two positive electrodes, which were placed into the inner can of a UM-2 alkaline cell. Then, into the vacant central space of the cylinder was inserted a cylinder of nonwoven 14.2 mm diameter polyamide textile 3.5 mm in height, which was used as a separator. The jelly-like negative electrode material of this Example was placed in the inner region of the separator.

The same type of cell was constructed as a reference cell, but the negative electrode material was the same material as that of the reference cell described in Examples 5. The cells were subjected to a continuous discharge under a 10 Ω load at −10°C. Duration times of both cells were determined until the average terminal voltage of 0.9 volts was reached and the results were compared. The ratio of the duration time of the cell of this invention to that of the reference was 1.45 : 1.00, indicating the effectiveness of this electrode composition at low temperatures.

EXAMPLE 7

Composition:
Incorporated negative electrode material described in Ex. 1   97 parts
Borax powder   1.0 parts
Pulverized cellulose   0.8 parts

EXAMPLE 8

Composition:
Incorporated negative electrode material represented in Example 2   92 parts
Borax powder   1.0 parts
Pulverized cellulose   0.8 parts

EXAMPLE 9

Composition:
Zinc particles (particle size through 100 mesh) amalgamated with 10% Hg   96 parts
Magnesium oxide powder   1.0 parts
Zinc oxide powder   1.0 parts
Borax powder   1.0 parts
Sodium polyacrylate   1.0 parts
Pulverized cellulose   0.8 parts The above described materials of Examples 7, 8, and 9 were mixed well in each case by a Vmixer. To 100 g of this mixture, 25 to 30 ml of ethanol or methanol was added and the mixture was kneaded. Alcohol was very effective in dissolving the gel forming material to form a paste of the desired viscosity. The paste obtained was rolled to form a sheet 1.2 mm thick. After evaporating the alcohol, disks 8.0 mm in diameter were punched from the sheet and they were used as the negative electrode materials. In an alternative preparation of the discs the kneaded paste could be cast into the desired shape and size.

A reference cell was prepared by the same method described above, except that zinc oxide, cellulose and borax were not incorporated in the negative electrode mixture. The negative electrode materials thus prepared were subjected to a current discharge in amounts of 200 ma/cm$^2$ in 38 percent KOH against a large nickel oxide positive electrode until an average cut-off voltage of 1.0 volts was reached. The ratios of duration time based on electrode composition of this invention to that of the reference cell were 1.43, 1.37 and 1.41 for Examples 7, 8, and 9, respectively. These results clearly indicate that the cells assembled with the electrode materials of these Examples improved the heavy duty characteristics of the cells. In addition, disks of the negative electrode mixture prepared as described were also shown to be effective. The amount of boric acid, its salts or boron oxide mixed in the negative electrode mixture ranged from 0.1 to 10 weight percent. Amounts of the boron compounds lower than this range exhibited detectable effects and amounts higher than this range gave electrode mixtures too hard to handle.

EXAMPLE 10

Over one face of a negative electrode material, which was fabricated as described in Example 9, was placed a nonwoven cotton sheet 0.3 mm thick. On top of the nonwoven cotton sheet was placed a nonwoven polyamide sheet 0.1 mm thick and an ethanolic solution of a carboxyvinyl polmer was applied between the surfaces as a binder. The laminate obtained was rolled into a unified sheet. Said sheet was punched to form 8.2 mm diameter disks 3.1 mm thick. 1000 JIS H-C mercuric oxide cells were assembled using the prepared negative electrode disks of this Example by the same method as described in Examples 1 to 3. The production yield using the methods of this invention was 92.4 percent, which is a significant improvement over the 68.0 percent yield achieved by prior art methods.

Whereas the methods of this invention lead to improvement in the initial capacity, heavy duty characteristics, low temperature characteristics and stability during storage of primary alkaline cells containing zinc oxide, an inorganic oxide, and a gel forming reagent and-/or pulverized cellulose and an alkaline electrolyte in the negative electrode materials, the methods of this invention are also applicable to any type of alkaline cell.

EXAMPLE 11

In order to determine the effective mixing range of the inorganic oxides, several UM—2 alkaline cells were assembled by varying the mixing ratios of the inorganic oxides in the negative electrode mixture. The basic composition of the negative electrode mixtures shown in Table 3 consists of 96 parts of 10 percent amalgamated zinc particles (particle size through 100 mesh) 2 parts of zinc oxide powder and 2 parts of carboxyvinylpolymer to which is added the various amounts of the three metallic oxides shown in Table 3, wherein the amounts of the oxides incorporated are shown in the first column. The method of making the cells was essentially the same as that disclosed in Example 5.

Cells thus assembled were subjected to a continuous 3 Ω discharge and duration periods were measured until an average minimum voltage of 0.9 volts was reached for each cell. The results are summarized in Table 3.

TABLE 3

| Inorganic Oxides | Duration period under a 3Ω continuous discharge (minutes) | | |
|---|---|---|---|
| Amount of inorganic oxide mixed per total amount of electrode materials | Magnesium Oxide | Titanium Oxide | Zirconium Oxide |
| 0 | 57 | 57 | 57 |
| 0.05 | 58.7 | 57.6 | 58.5 |
| 0.1 | 63.4 | 60 | 62 |
| 0.2 | 69 | 68 | 65 |
| 0.5 | 74 | 71.3 | 69.8 |
| 1.0 | 74.5 | 72.5 | 70.5 |
| 2.0 | 75.3 | 71.8 | 72 |
| 5.0 | 74 | 70.6 | 69 |
| 7.0 | 70.2 | 68.4 | 64 |
| 10.0 | 68.5 | 63 | 59.5 |
| 15.0 | 65 | 59 | 57 |
| 20.0 | 60.3 | 53 | 54.3 |
| 25.0 | 49.6 | 32 | 43.5 |
| 30.0 | 32.0 | 25 | 35 |

From the data shown in the table the most effective amounts of the added inorganic oxides range from 0.1 to 10 percent by weight of the total amount of the negative electrode.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. In an alkaline cell comprising:
    a. a positive electrode consisting of a positive electrode composition;
    b. a separator disposed between said positive electrode and a negative zinc electrode;
    c. an alkaline electrolyte as a component of said negative electrode material;
    d. a negative zinc electrode comprising a negative electrode material; wherein the improvement comprises said negative electrode material comprising finely divided zinc particles, from 0.1 to 20 percent by wt zinc oxide, a sufficient quantity of an alkaline electrolyte, from 0.05 to 10 10 percent by wt of a gel forming material durable to said alkaline electrolyte, 0.1 to 10 percent by wt of boric acid, its salts or boron oxide, from 0.1 to 20 percent by wt of an inorganic oxide or hydroxide which is stable to said eletrolyte and 0.1 to 10 percent by wt of pulverized cellulose, wherein the metal of said inorganic oxide or hydroxide is less noble than zinc.

2. The alkaline cell of claim 1, wherein said negative electrode further comprises a sheet of porous electrolyte holding material and a separator sheet.

3. The alkaline cell of claim 2, wherein said electrolyte holding material and said separator are bound together with said gel forming material.

4. The alkaline cell of claim 1, wherein said alkaline electrolyte contains dissolved metallic cations of said inorganic oxide.

5. The alkaline cell of claim 1, wherein said gel material is a metallic salt of polyacrylic acid comprising from 0.1 to 10 percent by weight of the total amount of said negative electrode material.

6. The alkaline cell of claim 1, wherein said metal of said inorganic oxide or hydroxide is magnesium, barium, titanium, aluminum, or zirconium.

* * * * *